US007311881B2

(12) United States Patent
Takenaka et al.

(10) Patent No.: US 7,311,881 B2
(45) Date of Patent: Dec. 25, 2007

(54) CHIPS, AND APPARATUS AND METHOD FOR REACTION ANALYSIS

(75) Inventors: Kei Takenaka, Kokubunji (JP); Toru Fujimura, Asaka (JP); Yasushi Goto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 147 days.

(21) Appl. No.: 10/931,064

(22) Filed: Sep. 1, 2004

(65) Prior Publication Data

US 2005/0136685 A1 Jun. 23, 2005

(30) Foreign Application Priority Data

Dec. 19, 2003 (JP) ............................ 2003-421957

(51) Int. Cl.
*B32B 27/04* (2006.01)
*B32B 27/06* (2006.01)
*B32B 27/08* (2006.01)
*B32B 27/14* (2006.01)

(52) U.S. Cl. ...................... 422/102; 422/103; 422/104; 427/189; 427/195; 427/527

(58) Field of Classification Search ................ 427/189, 427/195, 527
See application file for complete search history.

(56) References Cited

U.S. PATENT DOCUMENTS 4,021,504 A * 5/1977 Conrad et al. .............. 525/119
6,292,609 B1 * 9/2001 Matsushima et al. ......... 385/43
6,316,084 B1 * 11/2001 Claus et al. ................ 428/212
6,660,147 B1 * 12/2003 Woudenberg et al. ...... 204/455
6,729,352 B2 * 5/2004 O'Connor et al. .......... 137/827

FOREIGN PATENT DOCUMENTS

| | | |
|---|---|---|
| JP | 2002-357607 | 8/1997 |
| JP | 2002-102681 | 9/2000 |
| JP | 2002-237607 | 1/2001 |
| JP | 2002-243734 | 2/2001 |
| JP | 2003-302399 | 4/2002 |

OTHER PUBLICATIONS

Gau, H. et al., "Liquid Morphologies on Structured Surfaces: From Microchannels to Microchips", Science, vol. 283, (Jan. 1, 1999) pp. 46-49.
Zhao, B. et al., "Surface-Directed Liquid Flow Inside Microchannels", Science, vol. 291, (Feb. 9, 2001), pp. 1023-1026.
Gau, H. et al., "Liquid Morphologies on Structured Surfaces: From Microchannels to Microchips", Science, vol. 283, (Jan. 1, 1999) pp. 46-49.
Zhao, B. et al., "Surface-Directed Liquid Flow Inside Microchannels", Science, vol. 291, (Feb. 9, 2001), pp. 1023-1026.

* cited by examiner

*Primary Examiner*—Long V. Le
*Assistant Examiner*—Unsu Jung
(74) *Attorney, Agent, or Firm*—Reed Smith LLP; Stanley P. Fisher, Esq.; Juan Carlos A. Marquez, Esq.

(57) ABSTRACT

A chip having a deaerating function and requiring no bonding or welding for forming a channel, and an apparatus and method for the reaction analysis are provided. The chip contains a first substrate, a second substrate having a liquid inlet and a liquid outlet, and an intermediate member having hydro-phobicity and air permeability and forming a channel between the first and second substrates. It is thereby possible to prevent mixing of air bubbles into the channel.

9 Claims, 15 Drawing Sheets

CHIPS, AND APPARATUS AND METHOD FOR REACTION ANALYSIS

INCORPORATION BY REFERENCE

The present application claims priority from Japanese application JP2003-421957 filed on Dec. 19, 2003, the content of which is hereby incorporated by reference into this application.

FIELD OF THE INVENTION

The present invention relates to a reaction analysis relevant to a specific molecule in a specimen and a chip used therefor.

BACKGROUND OF THE INVENTION

With the substantial completion of decoding the human genome in 2001 as a turning point, the focus of studies in the field of biotechnology research is shifting from genomic to proteomic research in which pursuit is made about when, where and how genetic information possessed by individual living things is expressed in making proteins, and how these produced proteins function in the cells of individual organisms in cooperation with other proteins. The function of most proteins is related to their interaction with other biomolecules, so that one of the momentous subjects in the study of proteomes is the interaction between the proteins themselves or with other biomolecules. Further, in the researches on the interaction of biomolecules, it is imperative to know the equilibrium constant which indicates the strength of the intermolecular bond in the equilibrium state and the rate constant which indicates the velocity until equilibrium is reached. Biosensors are among the devices available for examining the interaction represented by such equilibrium constant and rate constant of biomolecules. Biosensors make use of the phenomenon of surface plasmon resonance. There are also known biosensors using a Dual Polarization Interferometer.

In this type of sensor device, the number of the sensors that can be measured simultaneously is considered to be 4 or so. For the efficient analysis of the interaction of the objective biomolecules, an apparatus allowing simultaneous measurement of a greater number of sensors is required.

Simultaneous measurement of multiple sensors calls for the improvements of various factors such as miniaturization and greater compactness of the sensors, reduction of the amount of the specimen required, shortening of measuring time, miniaturization of the apparatus itself, and miniaturization of the sensor and flow systems. Studies for miniaturization of measuring devices are being made enthusiastically in recent years, and this field of study is referred to as μTAS (Micro Total Analysis System) or Lab-On-Chip in the art.

In the field of μTAS, particularly the micro-flow cells and micro-valves which handle fluids, are called microfluidic devices. Combinations of such microfluidic devices and multiple sensors have been proposed as a microchip in JP-A-2002-243734 and an integrated reactor in JP-A-2002-357607. The microchip disclosed in JP-A-2002-243734 comprises a substrate to which the organic high molecules are fixated as spots or strip-wise, and another substrate having a recessed portion that provides a micro channel, said both substrates being joined together. In the integrated reactor disclosed in JP-A-2002-357607, a groove is formed in a glass or silicon substrate to form a capillary, and DNA is bound to its surface by using the lithographic techniques.

BRIEF SUMMARY OF THE INVENTION

Microfluidic devices, because of their small internal volume, have many meritorious points such as easy control of minute amounts of fluid, high-speed reaction in a small space and mass producibility of the devices. However, they also have problems due to their size (several microns to several hundred microns in width and depth).

In the analytical chip disclosed in JP-A-2003-302399, the leading end of the flowing fluid is aligned in the width direction of the channel by providing alternately the portions with high affinity for the flowing liquid and the portions with low affinity on one of the faces forming the long side of the slit-shaped cross section of the micro channel, making it possible to prevent the fluid from dragging in the air bubbles which were present from the beginning in the channel when the fluid is supplied for the first time into the micro channel.

In the micro-chemical device having a heating mechanism described in JP-A-2002-102681, a heating section is provided at a part of a capillary channel, and an air vent which is hydrophobic at its surface is branched at the heating section to allow escape of air.

In the above-mentioned two patents, consideration is given to the entrance of air bubbles into the channel, but the mechanisms disclosed in the above patents can not eliminate the possibility of mixing of air bubbles.

The following problems may be pointed out in connection with microfluidic devices. Firstly, since the surface tension becomes dominant in the micro-region, it is difficult to remove air bubbles accumulated in the micro channel, so that in making a microfluidic device, there are required; a structure which inhibits air bubbles from entering the micro channel, a structure which does not allow generation of air bubbles in the micro channel, and a structure which removes the air bubbles from the micro channel when they are produced. Also, in a micro channel, it is desirable to remove, during flow of the liquid, the air bubbles which got mixed into or were generated in the liquid due to some causes such as an improper operation by a worker or a reduction of water pressure. Even in case a branch path for air venting is provided, it is necessary to prevent the flowing liquid from dragging in air bubbles which were present from the beginning in the channel when the liquid is supplied for the first time into the capillary channel from the branch point on, and to remove air bubbles which got mixed into or were generated in the liquid at the time of its supply. Further, since the air vent is provided after the capillary channel was formed, the manufacturing process is complicated, the production cost is elevated, and the available shape of the capillary channel is restricted.

Another problem concerns bonding or welding employed in forming the micro channel. In the case of forming the micro channel by using a material other than self-adhesive PDMS (Polydimethylsiloxane), particularly glass, silicon or a resin such as acrylic resin, it needs to bond a grooved substrate to other flat plate with an adhesive or to weld them together. Use of an adhesive involves a possibility that the material contained in the adhesive might influence the object of measurement. Also, the adhesive may ooze out to the micro channel impairing optical measurement. In the case of welding using laser or such means, the material usable is restricted, and also impropriety may occur at or around the weld zone. Further, as a fundamental problem, in the case of a micro channel using the biomolecules bound to a specific portion in the channel, it needs to bind the biomolecules prior to bonding or welding. When selecting which biomolecules are to be bound according to the purpose of use, the binding of the selected biomolecules is often conducted by the apparatus user. In this case, for the reasons mentioned above, the apparatus user needs the techniques and equipment for joining or welding, and there is a possibility that the handling of the apparatus would become difficult.

In view of the above, the present invention is envisioned to provide chips having micro channels, and an apparatus and method for chemical reactions, by which the above-said problems can be solved.

Other objects, features and advantages of the invention will become apparent from the following description of the embodiments of the invention taken in conjunction with the accompanying drawings.

DESCRIPTION OF REFERENCE NUMERALS

Figure 1:
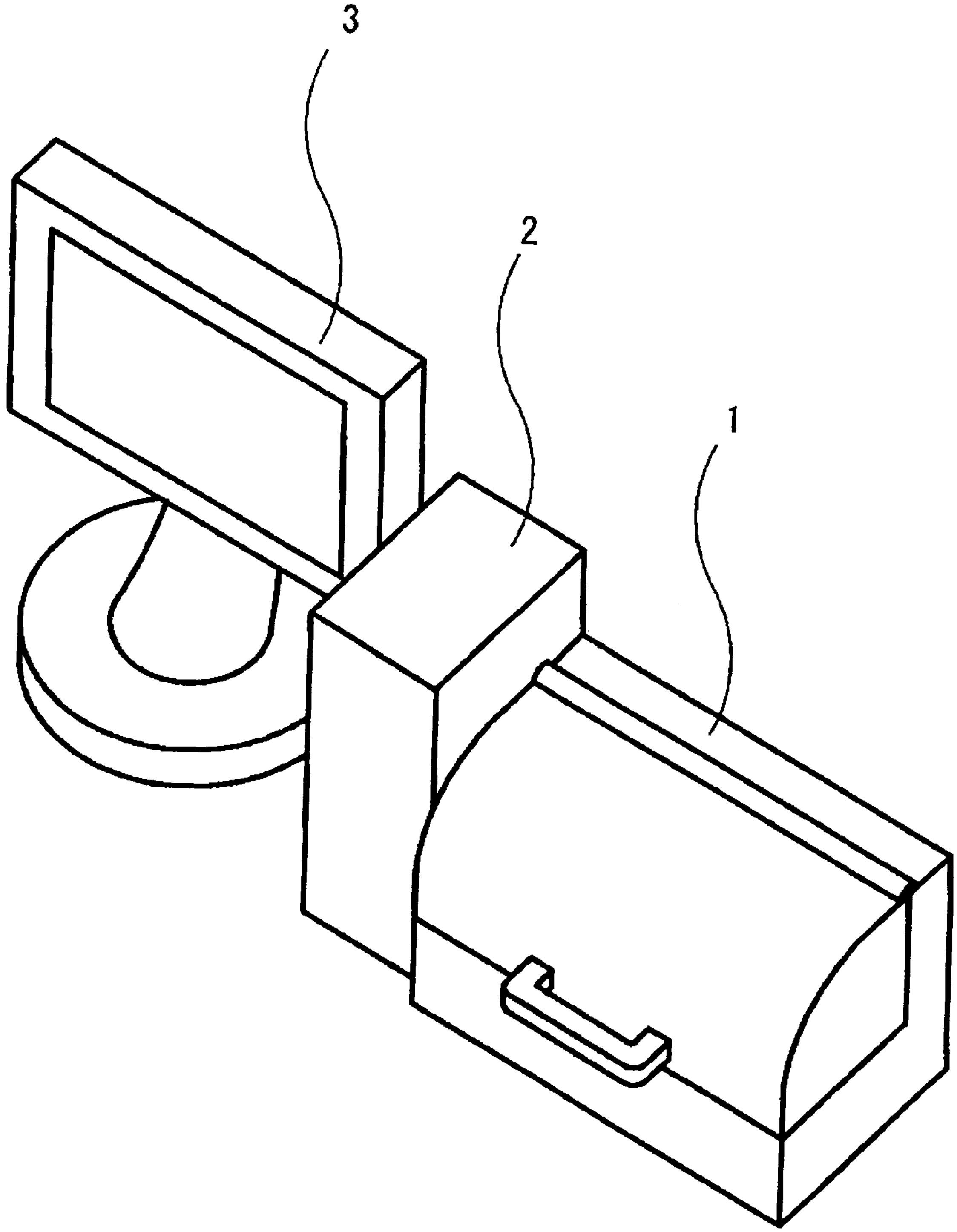
FIG. 1 is a bird's-eye view of a biomolecule interaction analyzer in an example of the present invention.

1: biomolecule interaction analyzer, 2: system device, 3: monitor, 10: flow cell, 11: top cover, 12: optical window, 13: block, 20: chip, 21: groove, 22: detection region, 23: liquid, 24: interface, 25: groove, 30: liquid supply section, 40: detection section, 41: white light source, 42: spectroscope, 43: detector, 50: waste liquid container, 61: top cover, 62: inner cover, 63: block, 70: chip, 71: groove, 72: detection region, 91: monochromatic light source, 92: detector, 93: incident light, 94: reflected light, 110: concave portion, 111: inlet opening, 112: outlet opening, 113: inlet channel, 114: outlet channel, 115: observation hole, 121: inlet hole, 122: outlet hole, 123: size difference, 201: substrate, 202: hydrophilic thin film layer, 203: water-repellant particle layer, 204: dry film resist, 205: mask, 206: ultraviolet rays, 207: optical fiber for incident light, 208: optical fiber for coherent light, 209: reflected light, 210: reflected light, 220: array chip, 221: inlet end, 222: discharge end, 301: buffer pump, 302: specimen pump, 303: dissociating solution pump, 304: buffer reservoir, 305: specimen reservoir, 306: dissociating solution reservoir, 307: buffer valve, 308: specimen valve, 309: dissociating solution valve, 310: flow cell valve, 311: valve-connected air hole for buffer solution, 312: valve-connected air hole for specimen, 313: valve-connected air hole for dissociating solution, 315: air for arranging between buffer and specimen, 316: buffer (solution), 317: air for arranging between specimen and dissociating solution, 318: specimen, 611: inlet opening, 612: outlet opening, 613: inlet channel, 614: outlet channel, 621: inlet hole, 622: discharge hole, 630: concave portion, 701: light-transmittable substrate, 702: metallic thin film layer, 703: water-repellant particle layer, 704: prism.

DETAILED DESCRIPTION OF THE INVENTION

The chip according to the present invention comprises characteristically a first substrate and an intermediate member having hydrophobicity and air permeability and arranged to form a prescribed channel on the first substrate. "Air permeability" referred to herein designates the property of the member to allow passage of air through it when a solution is allowed to flow. "Hydrophobicity" means that the angle of contact with water becomes 90° or greater. At least a part of the surface of the first substrate is coated with a thin film. The film surface may be hydrophilic at least partly. The first substrate may be made of any one of the materials selected from silicon, glass, quartz, PMMA, titanium oxide, silicon oxide, zirconium oxide, hafnium oxide and tantalum oxide. The thin film may be made of any one of the materials selected from silicon nitride, silicon, glass, quartz, PMI-IVIA, titanium oxide, silicon oxide, zirconium oxide, hafnium oxide and tantalum oxide. There may be further provided a second substrate having a liquid inlet and a liquid outlet.

The apparatus according to the present invention is characterized by having: a cell for holding a chip comprising a first substrate, a second substrate provided with a liquid inlet and a liquid outlet, and a hydrophobic and air-permeable intermediate member forming a prescribed channel between the first and second substrates; a pipe for introducing a liquid or gas to the liquid inlet; another pipe for discharging the liquid or gas from the liquid outlet; an optical section for irradiating light on the channel; a detection section for detecting a reaction between a specific molecule fixed to the channel and a material contained in a specimen supplied into the channel; and an analysis section for analyzing a detection result in the detection section. The cell comprises a cover and a base block, and the chip may be held in the region between said cover and base block. The optical section has optical fiber, and the cover may have a hole for passing the optical fiber therethrough. The first substrate is provided with a metallic film on its side facing the second substrate and a prism on the opposite side. The optical section irradiates light on the prism, and the detection section may be designed to detect the reflected light from the metallic thin film via the prism.

The method according to the present invention comprises the steps of: providing in a container a first substrate, a second substrate having a liquid inlet and a liquid outlet, and a hydrophobic and air-permeable intermediate member forming a prescribed channel between the first and second substrates; introducing a first liquid, a first gaseous layer, a specimen, a second gaseous layer and a second liquid into the container in order; carrying out a reaction between the specific molecule fixed to at least a part of the channel and the material contained in the specimen; and detecting a result of the reaction by irradiating light on the container. In the detection step, there may be detected either of the following matters: degree of light absorption, degree of scattering of light, degree of light reflection and degree of fluorescence or luminescence on a surface to which the specific molecule is fixed.

According to this arrangement, the gas which was present from the beginning in the channel or the air bubbles which were mixed or generated in the liquid during flow of the liquid are allowed to slip out from the interface between the intermediate member and other parts or from the intermediate member itself when the liquid is introduced. This makes it possible to prevent the air bubbles from staying in the channel. Further, since the channel composed by the intermediate member has air permeability in itself, no specific mechanism or step for deaeration is required. Therefore, construction of channel admits of a design with a high degree of freedom and low cost.

Further, because of the above arrangement, it is possible to construct a channel with no need of bonding or welding between the intermediate member and the second substrate. Thus, a deaeration function with high operation efficiency can be realized.

EXAMPLES

The present invention is further illustrated by the following examples.

Example 1

A reaction analyzer using the chips according to the present invention, particularly a biomolecule interaction analyzer, is explained here with reference to FIGS. 1 to 21 of the accompanying drawings. An exemplary process for analyzing the interaction between the biomolecules by using the biomolecule interaction analyzer according to the present invention is explained.

FIG. 1 is a bird's-eye view of the biomolecule interaction analyzer according to the present invention. This biomolecule interaction analyzer 1 is connected to a system unit 2 which controls the analyzer 1 and analyzes the signals detected by the analyzer. This system unit 2 is connected in turn to a monitor 3 which displays the contents of the work of the biomolecule interaction analyzer 1.

Figure 2:
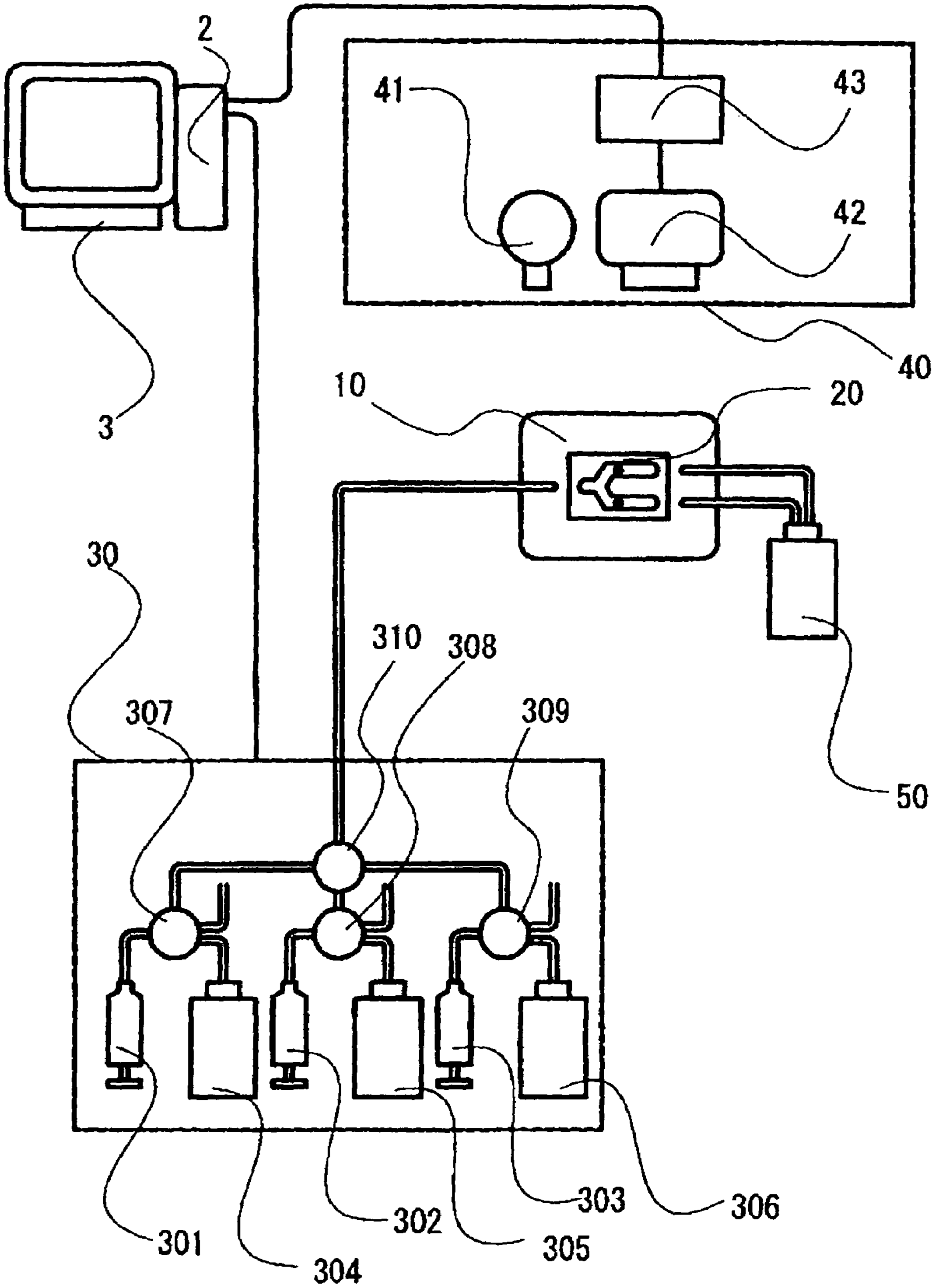
FIG. 2 is a general block diagram of a biomolecule interaction analyzer 1 in an example of the present invention.

FIG. 2 is a general block diagram of the biomolecule interaction analyzer 1. Analyzer 1 comprises a chip 20 having fixated to the detecting region the probe molecules specifically bound to the objective biomolecules, a flow cell 10 provided with a channel for supplying a reagent and a specimen to the chip 20 and a channel for discharging them from the chip 20, a fluid supply section 30 for supplying the reagent and specimen to be used to the flow cell 10, a discharge liquid (waste liquid) container 50 for storing the reagent and specimen discharged from the flow cell 10, a detection section 40 for optically detecting the objective biomolecules bound specifically to the probe molecules on the chip 20, a system unit 2 which analyzes the operation of the fluid supply section 30 and the signal obtained from the detection section 40, and a monitor 3 which outputs the work contents.

In the fluid supply section 30 are provided a buffer pump 301, a specimen pump 302 and a dissociating solution pump 303 for supplying the reagent and the specimen to be used, as well as a buffer reservoir 304, a specimen reservoir 305 and a dissociating solution reservoir 306 for storing the reagent and the specimen. There are also provided a buffer valve 307, a specimen valve 308, a dissociating solution valve 309 and a flow cell valve 310 for switching the channels between the respective pumps, reservoirs and flow cell. "Specimen" is the object of examination, and it principally refers to a substance containing the objective biomolecules or a solution of a sample which may contain the objective biomolecules. "Dissociating solution" is a reagent which dissociates the objective biomolecules bound to the probe on the chip 20 and returns the chip 20 to the state before use. "Buffer" is liquid in a broad sense, and for instance PBS buffer is used in this invention. "Dissociating solution (reagent)" is liquid in a broad sense, and for instance 20 mM HCl is used.

Detecting section 40 is constituted from a white light source 41, a spectroscope 42 which practices spectral resolution of the output light obtained from the chip 20 as a datum indicating the condition of binding of the objective biomolecules, and a detector 43 which detects the spectrum.

Figure 3:
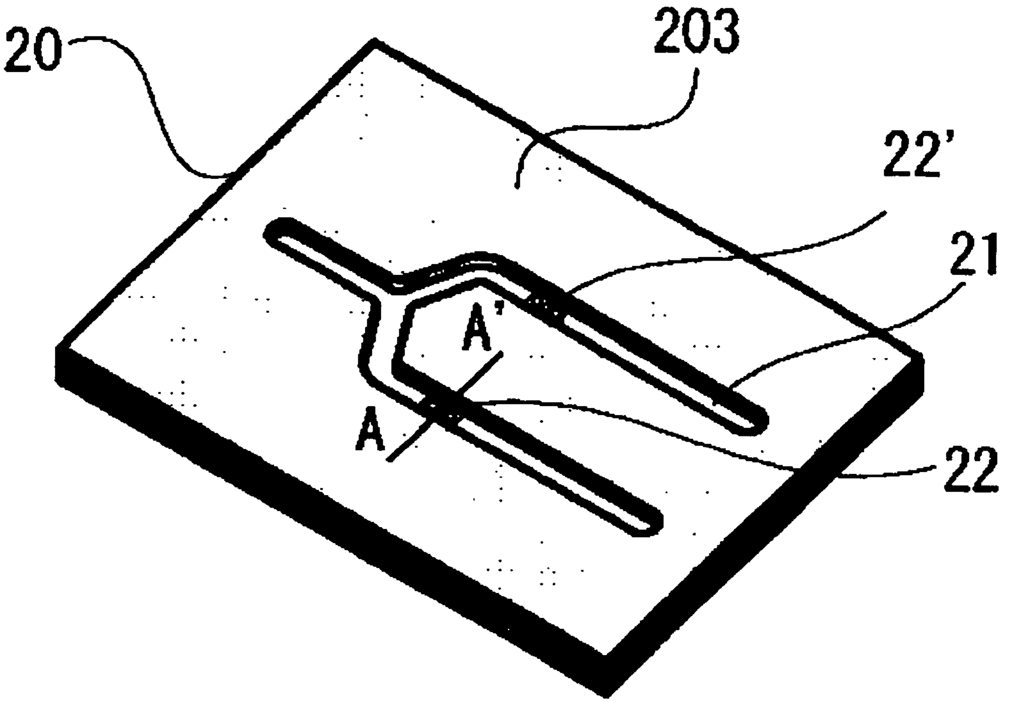
FIG. 3 is a bird's-eye view of a chip in an example of the present invention.

FIG. 3 is a bird's-eye view of the chip 20. Chip 20 has a groove 21 in one side thereof, and also has detection regions 22, 22' for detecting the objective biomolecules on the surface of said groove 21. One of the detection regions 22 has attached to its surface a probe binding the objective biomolecules, while the other detection region 22' has no such a probe attached. This probe-free detection region 22' is used as reference. The detection results from the detection region 22 are not confined to those derived from binding of the objective biomolecules and the probe, but also reflect the matters relating to the safety of the apparatus such as change of intensity of the light source and the influences of the non-specific adsorption of the objective biomolecules to the detection region. In order to eliminate the matters other than binding of the objective biomolecules and the probe from the detection results, the detection results from the probe-free detection region 22' are subtracted from the detection results from the probe-attached detection region 22, thereby removing the influence of non-specific binding to the surface of the detection region to allow correct analysis of interaction between the objective biomolecules and the probe.

Figure 4:
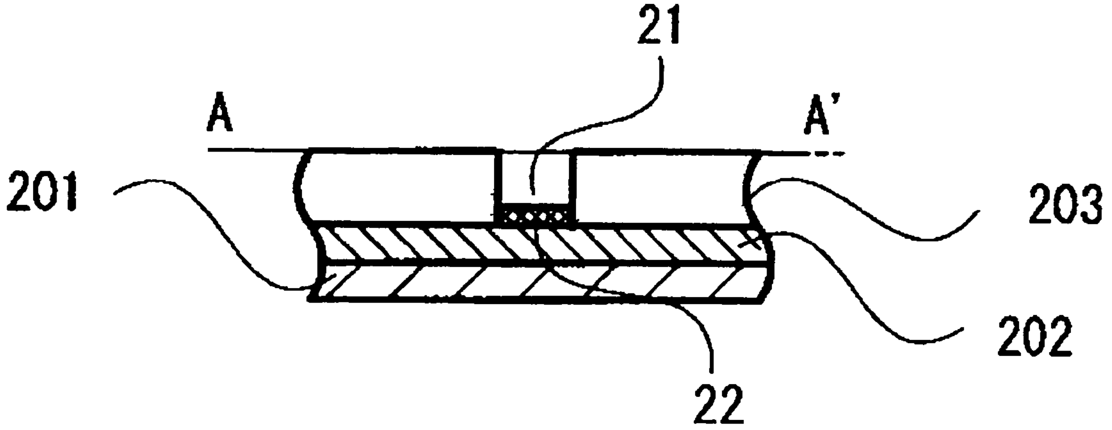
FIG. 4 is a cross section of the chip in an example of the present invention.

FIG. 4 is a cross section of chip 20. Chip 20 comprises a substrate 201, a hydrophilic thin film layer 202 and an intermediate layer which is a water-repellant particle layer 203. Groove 21 is defined by a bottom having a hydrophilic surface and walls composed of water-repellant particles. Of surfaces of chip 20 having groove 21, the surface of the hydrophilic thin film layer 202 is hydrophilic while the surface of water-repellant particle layer 203 is water-repellant, that is, the surface of water-repellant particle layer 203 is also hydrophobic. For instance, silicon is used for substrate 201, silicon nitride is used for thin film layer 202, and fluoroplastic particles are used for water-repellant particle layer 203. Other materials usable for substrate 201 include glass, quartz, PMMA (polymethyl methacrylate, acrylic resins), titanium oxide, silicon oxide, zirconium oxide, hafnium oxide and tantalum oxide. Other materials usable for hydrophilic thin film layer 202 include glass, quartz, titanium oxide, silicon oxide, zirconium oxide, hafnium oxide and tantalum oxide. For water-repellant particle layer 203, the water-repellant particles having a size of from about 10 nm to about 1 mm are preferably used. Other materials usable for this layer include fine particles of silicone resins and silicon powder. "Water-repellant (or hydrophobic)" referred to herein means that the angle of contact with water becomes 90° or greater, and "hydrophilic" means that the angle of contact with water becomes less than 90°. Proper material is selected in consideration of the purpose of use of the apparatus and the combination of substrate 201, hydrophilic thin film layer 202 and water-repellant particle layer 203 used.

Figure 5:
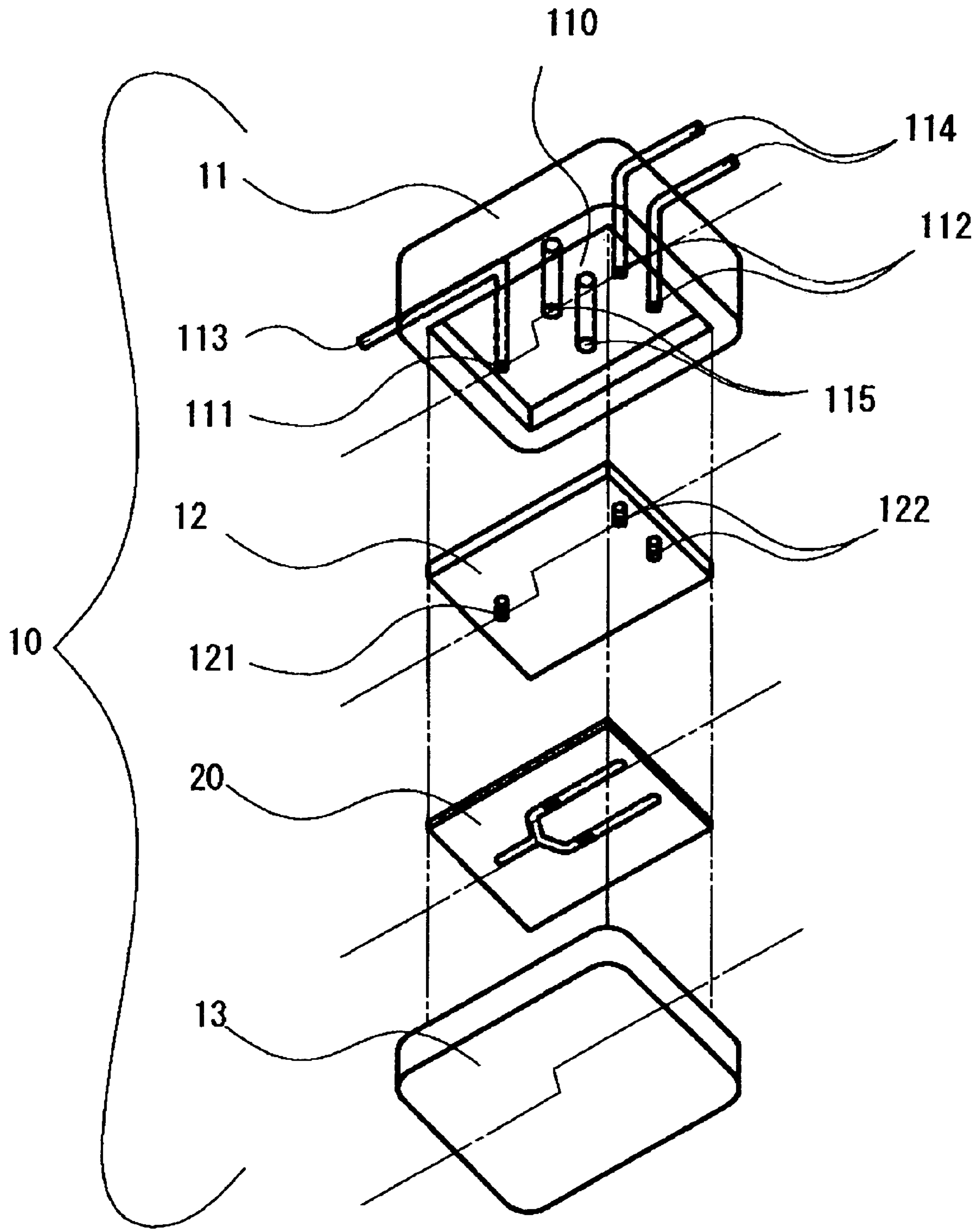
FIG. 5 is an exploded view of a flow cell in an example of the present invention.

FIG. 5 is an exploded view of flow cell 10 and its interior. Flow cell 10 consists of a top cover 11, an upper substrate constituting an optical window 12, and a base block 13. In use, these members are placed one over another in the order of top cover 11, optical window 12, chip 20 and block 13. In the upper substrate constituting optical window 12 is formed a channel in the region opposed to said groove. In view of this, it may be said a chip composing element.

Top cover 11 is provided with a concave portion 110 for accommodating optical window 12 and chip 20, an inlet opening 111 for supplying a reagent and a specimen to flow cell 10 via optical window 12, an outlet opening 112 for discharging the reagent and specimen from flow cell 10 via optical window 12, a supply channel 113 connecting liquid supply section 30 and flow cell 10, a discharge channel 114 connecting flow cell 10 and waste liquid container 50, and observation holes 115 for optical detection. These observation holes 115 have the functions of fixing the optical fiber and shutting off light entering the optical fiber from the outside as described below when optical fiber is used for the detection at the detection region. In some structural designs, however, such observation holes may not be provided. In optical window 12 are provided an inlet opening 121 which is a through hole for supplying a reagent and a specimen to the flow cell, and an outlet opening 122 which is also a through hole for discharging the reagent and specimen from the flow cell, and at least a part of the side facing chip 20 is made water-repellant (hydrophobic). For the water-repellant treatment, a material showing high permeability in the detection wavelength region and limited in scattering is preferably used, and such water repellency can be provided by fluorine or silicone resin coating or by applying a film of such resin. For the optical window, a material with high permeability in the detection wavelength region and limited in scattering, such as glass, quartz or PMMA, is preferably used.

Figure 6:
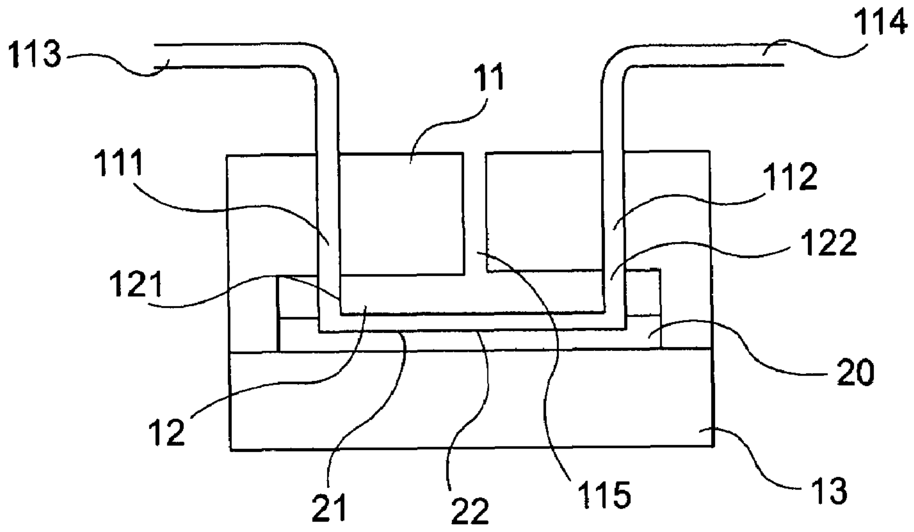
FIG. 6 is a cross section of the flow cell assemblage in an example of the present invention.

FIG. 6 is a cross section of flow cell 10 in an assembled state. Flow cell 10 comprises essentially a top cover 11, an optical window 12 and a base block 13. At the time of use, the respective members are placed one over another in the order of top cover 11, optical window 12, chip 20 and block 13. Chip 20 is set so that at least a part of the portion other than groove 21 on the grooved side will be in contact with optical window 12. Optical window 12 and chip 20 are housed in a concave portion 110 of top cover 11, and block 13 and top cover 11 are fixed. Thereby optical window 12 and chip 20 are fixed in a manner so that they are pressed against the top cover 11. Inlet port 111, inlet opening 121 and one end of groove 21, outlet port 112, outlet opening 122 and another end of groove 21, and detection region 22 and observation hole 115, are placed in alignment with each other. A channel is formed in the region where groove 21 and optical window 12 are opposed to each other. The reagent and specimen supplied to flow cell 10 from liquid supply section 30 is passed through supply channel 113, inlet port 111, inlet opening 121, groove 21, discharge opening 122, discharge port 112 and discharge channel 114 to flow into the used liquid container. Detection region 22 is observed from observation holes 115 through optical window 12. Interposition of optical window 12 presents no optical problem because of high permeability in the detection wavelength region and no scattering.

Figure 7:
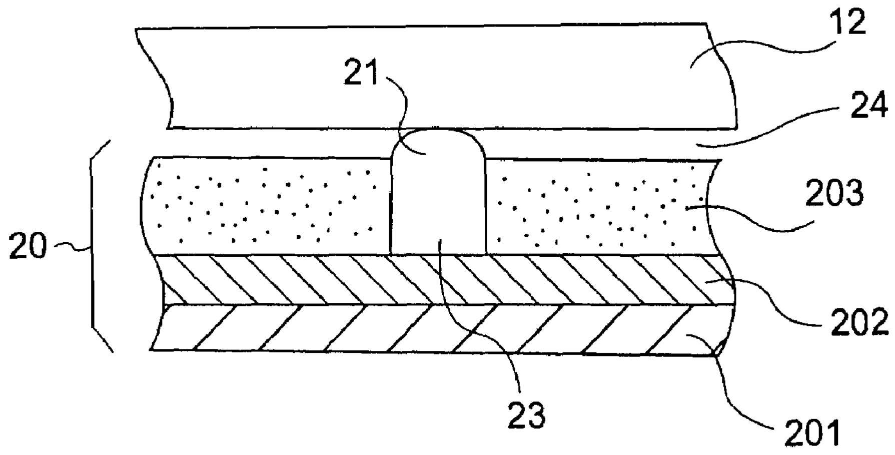
FIG. 7 is a cross section of a chip and an optical window in an example of the-present invention.

FIG. 7 is a cross section of chip 20 and optical window 12 set in position in flow cell 10, which shows a situation in which a liquid 23 such as reagent or specimen flows in the channel formed in the region where groove 21 of chip 20 and optical window 12 are opposed to each other. The contact area of chip 20 and optical window 12 is not bonded with an adhesive or welded as by heat or ultrasonic welding, with only a part of the surface of chip 20 being pressed by top cover 11 and block 13. However, since at least a part of the portion other than groove 21 on the grooved side of chip 20 is water-repellant (hydrophobic), the liquid 23 such as reagent or specimen is allowed to flow without leaking from groove 21 as far as the pressure of the liquid 23 flowing in groove 21 is lower than the surface tension and atmospheric pressure at interface 24. Also, even in case the air bubbles should have been mixed in the liquid in the course of flowing, they can escape into the spaces present in the walls of groove 21 composed of water-repellant particles 203 or between chip 20 and optical window 12 and won't flow to the detection region, so that it is possible to prevent impediment of measurement by the generation of air bubbles. Because of such a mechanism, the water-repellant particle layer is provided especially with air permeability, namely the property to let the air pass through when a solution is passed in the groove.

In the case of using chip 20 with groove 21 composed of a water-repellant material as substitution for water-repellant particles 203, air bubbles are allowed to escape into the spaces formed between chip 20 and optical window 12, so that it is possible to avoid disturbance to measurement by mixing of air bubbles.

Figure 8:
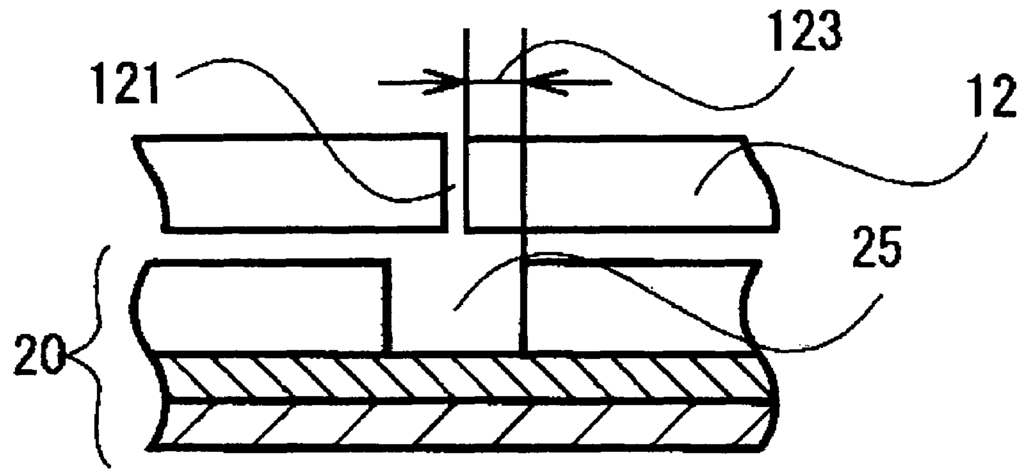
FIG. 8 is a cross section of a chip and an optical window in an example of the present invention.

FIG. 8 shows dimensional relation between inlet hole 121 of optical window 12 and groove 25 near said hole 121. Groove 25 is designed so that its length near inlet hole 121 will be greater than the length of inlet hole 121, at least in the direction perpendicular to the flowing direction of the solution in the groove. This provides a positional allowance by an amount indicated by 123 in relation to the position of inlet hole 121 and that of groove 25 when positioning optical window 12 and chip 20. Thus, even if a dimensional difference of an amount indicated by 123 is produced between inlet hole 121 and groove 25 near this inlet hole 121, it is possible to secure a channel between optical window 12 and groove 25. This facilitates positioning when incorporating chip 20 in flow cell 10, and also the working cost of flow cell 10 required for elevating the positioning precision can be reduced. The same holds true with the dimensional relation between discharge hole 122 and the groove near this discharge hole 122.

Figure 9:
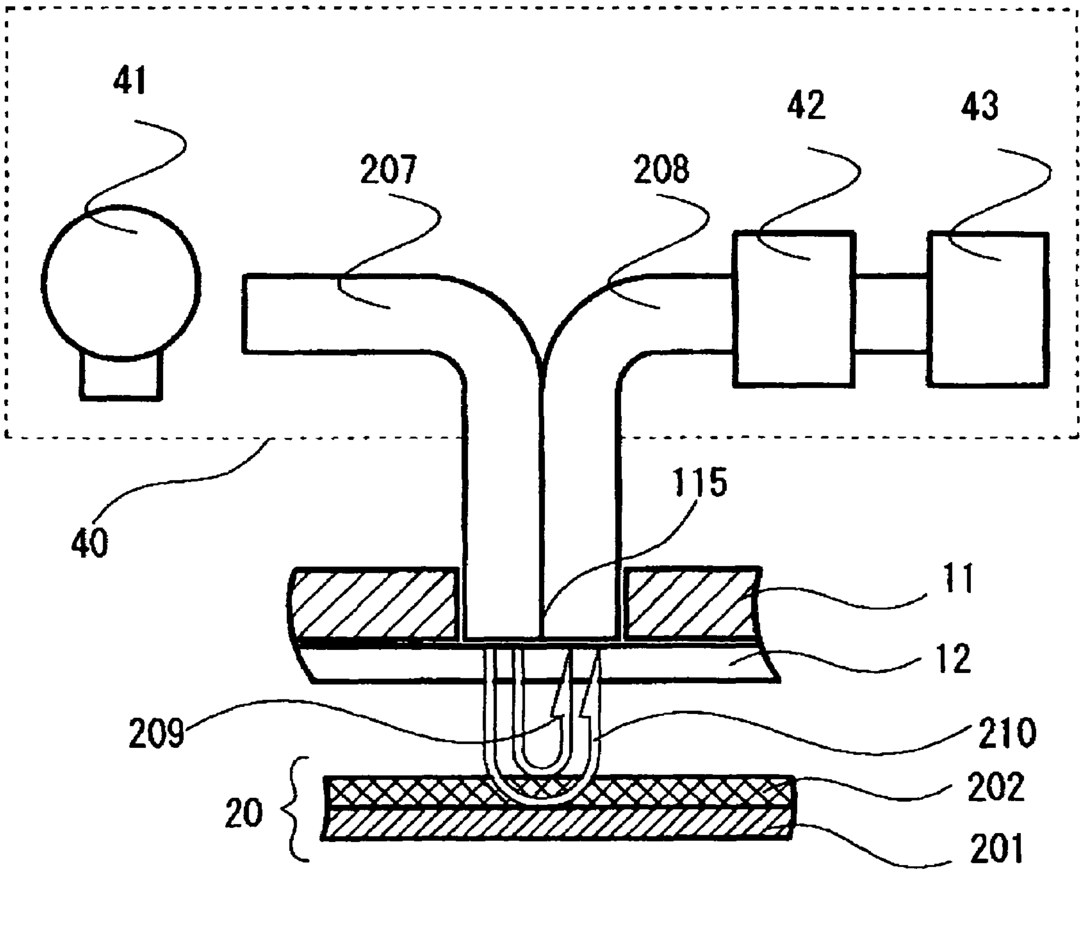
FIG. 9 is a block diagram of a detection section and a flow cell in an example of the present invention.

FIG. 9 illustrates a combination of detection section 40 with a part of flow cell 10. Detection section 40 comprises a white light source 41, an optical fiber for incident light 207, an optical fiber for coherent light 208, a spectroscope 42, and a detector 43. Optical fiber for incident light 207 and optical fiber for coherent light 208 are fixed at an end in observation hole 115 formed in top cover 11 of the flow cell 10. In order to minimize the influence of the reflected light of optical window 12, it is desirable to position an end of each optical fiber as close to optical window 12 as possible. A thin film of a material having a high refractive index, such as 1.8 to 3.0, for example silicon nitride with a refractive index of about 2.3, is used as thin film layer 202 of chip 20, and a material having an appropriate reflectance, for example silicon is used for substrate 201 of chip 20. The white light from white light source 41 enters chip 20 via optical fiber for incident light 207, while the coherent light of reflected light 209 from thin film layer 202 and reflected light 210 from substrate 201 enters spectroscope 42 via optical fiber for coherent light 208. Detector 43 detects the coherent light resolved into a spectrum by spectroscope 42.

Using substrate 201 with a high reflectance and thin film layer 202 with a high refractive index and binding a probe which specifically binds to the objective biomolecules to the surface of said thin film layer 202, a mechanism for detecting the objective biomolecules is provided. Since the refractive index of the biomolecules is approximately 1.5, the apparent refractive index of thin film layer 202 increases when the probe is bound to the objective biomolecules, so that the coherent light spectrum is shifted to the greater wavelength side. Also, when the objective biomolecules dissociate from the probe, the apparent refractive index returns to normal, restoring the spectrum of the coherent light. It is possible to determine the state of binding of the objective biomolecules by analyzing the peak value of the spectrum by system unit 2 (FIG. 2) during measurement thereof and determining its change with time.

Figure 10:
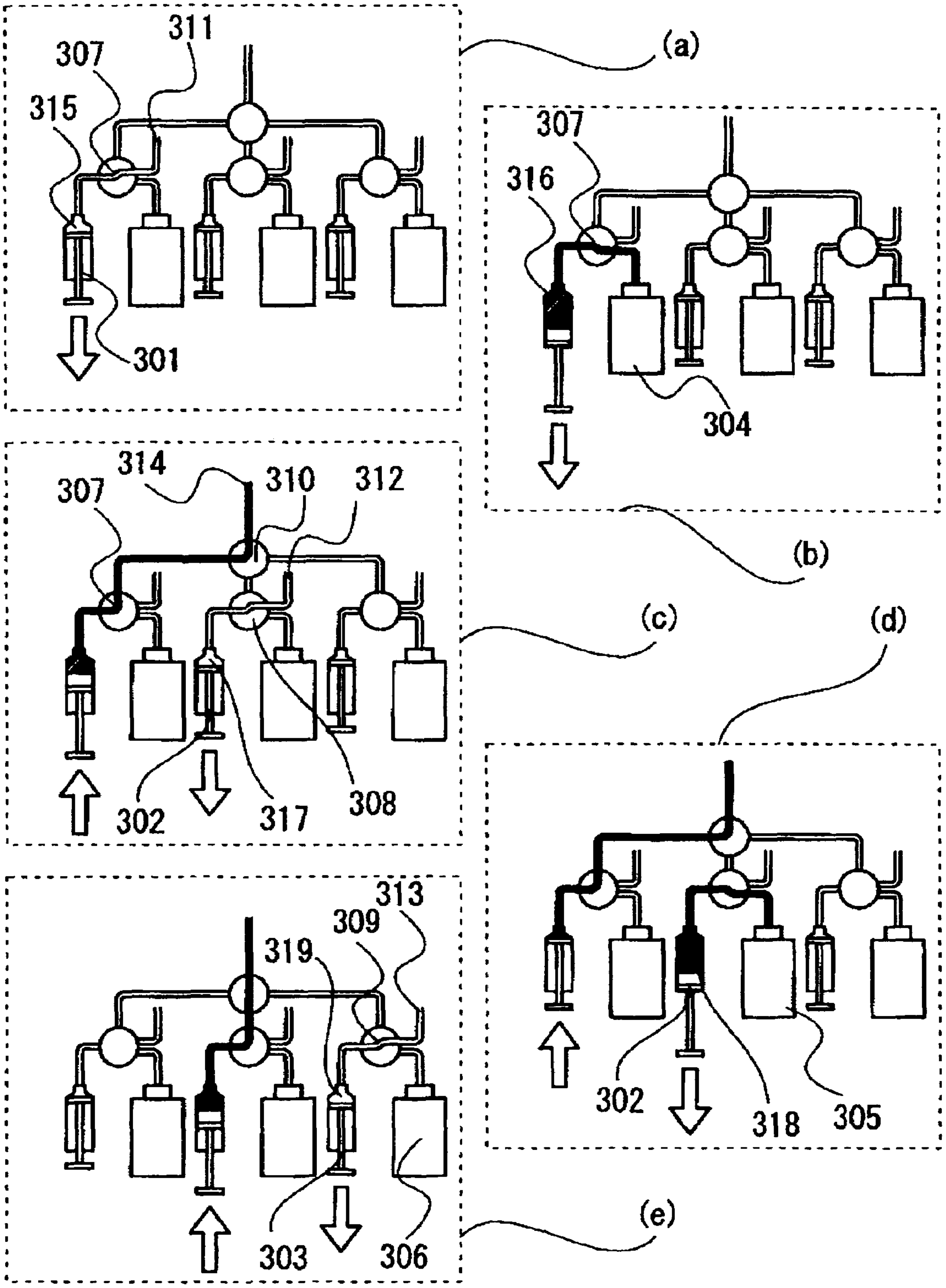
FIG. 10 is an illustration of an operating procedure of a liquid supply section in an example of the present invention.

FIG. 10 is an operational illustration of liquid supply section 30. The process of supplying the liquids in the order of buffer, specimen and dissociating solution is explained with reference to FIG. 10. Buffer pump 301, specimen pump 302 and dissociating solution pump 303 are all syringe pumps, and suction is indicated by the downward arrow while liquid supply is indicated by the upward arrow. The operations of the respective pumps and valves in liquid supply section 30 are controlled by system unit 2 (FIG. 2).

FIG. 10(*a*) shows the situation of liquid supply section 30 when buffer pump 301 is operated to suck in air for arranging between buffer and specimen 315 for forming an air gap. In this situation, buffer valve 307 connects buffer pump 301 and buffer valve-connecting air hole 311. Air gap is an air layer interposed between the different types of liquid when these liquids are supplied continuously, and it prevents mixing of the two liquids by diffusion of the liquid components. This air layer may be replaced by a layer of a gas other than air depending on the situation.

FIG. 10(*b*) depicts the aspect of liquid supply section 30 when buffer pump 301 is operated to suck in buffer 316. In this aspect, buffer valve 307 connects buffer pump 301 and buffer reservoir 304.

FIG. 10(*c*) shows the condition of supply of buffer and air for arranging between buffer and specimen to flow cell 10 (FIG. 2) by buffer pump 301 and suction of air for arranging between specimen and dissociating solution 317 by specimen pump 302. Buffer pump 301 is operated to flow buffer and air for arranging between buffer and specimen flow into flow cell 10 in that order. Buffer valve 307 connects buffer pump 301 and flow cell valve 310, and flow cell valve 310 connects buffer valve 307 and flow cell 10 (FIG. 2). Specimen valve 308 connects specimen pump 302 and specimen valve-connecting air hole 312.

FIG. 10(*d*) illustrates the situation in which buffer pump 301 is operated to supply buffer and air for arranging between buffer and specimen into flow cell 10 (FIG. 2) and specimen pump 302 is operated to suck in specimen 318. Specimen valve 308 connects specimen pump 302 and specimen reservoir 305.

FIG. 10(*e*) shows the mode in which specimen pump 302 is operated to supply specimen and air for arranging between specimen and dissociating solution to flow cell 10 (FIG. 2) while dissociating solution pump 303 is operated to suck in air for arranging between dissociating solution and buffer 319. Specimen pump 302 supplies specimen and air for arranging between specimen and dissociating solution to flow cell 10 (FIG. 2) in that order. Specimen valve 308 connects specimen pump 302 and flow cell valve 310, and flow cell valve 310 connects specimen valve 308 and flow cell 10 (FIG. 2). Dissociating solution valve 309 connects dissociating solution pump 303 and dissociating solution valve connecting air hole 313. Because of the presence of air for arranging between buffer and specimen 315 between buffer 316 and specimen 318, mixing of buffer 316 and specimen 318 in their course of flowing into flow cell 10 (FIG. 2) can be avoided. Then the dissociating solution is supplied to flow cell 10 (FIG. 2). Mixing of specimen and dissociating solution in the flowing process can be avoided for the same reason.

The air used for air gap, such as air for arranging between buffer and specimen 315, slips out through water-repellant particles 203 or from between chip 20 and optical plate 12 when flowing in the channel (FIGS. 6 and 7) constituted by groove 21 of chip 20 and optical plate 12 set in flow cell 10, so that it gives no impediment to the measurement. The above mechanism allows successive introduction of buffer, first air layer, specimen (sample) and second air layer into chip 20 in that order.

Figure 11:
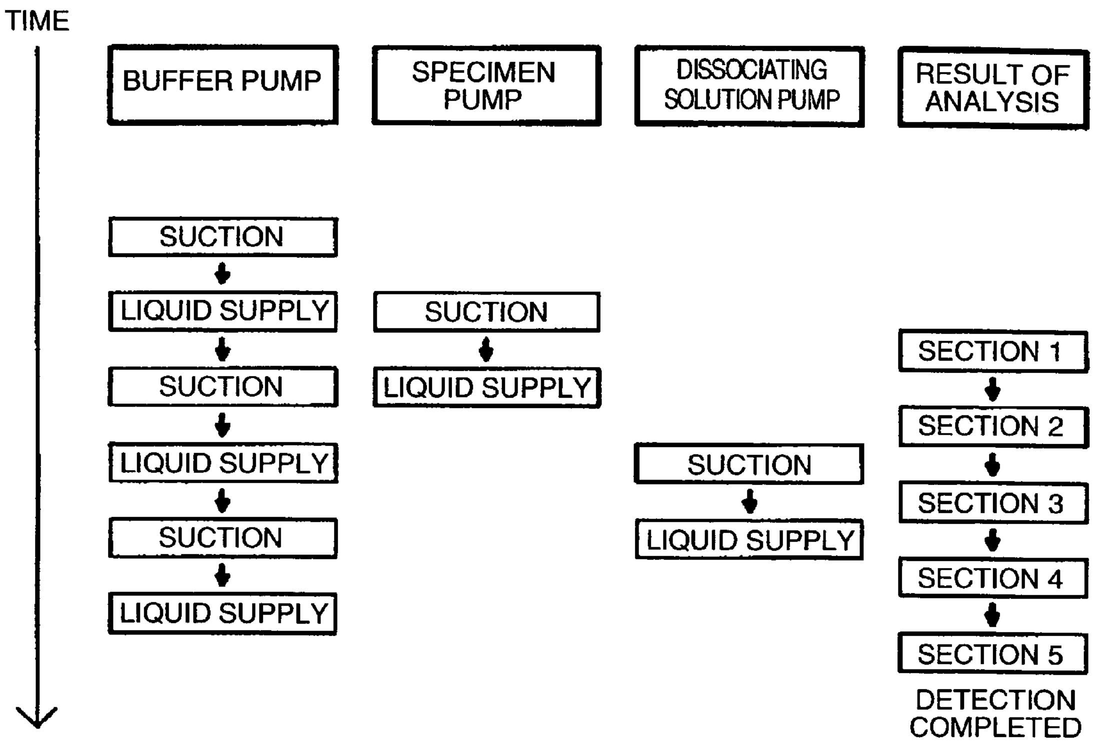
FIG. 11 is an illustration of an operating procedure in an example of the present invention.

FIG. 11 is a flow chart illustrating the process of determination of the objective biomolecules in a specimen by using the biomolecule interaction analyzer according to the present invention. In the chart, the modes of operation of the buffer pump, specimen pump and dissociating solution pump in the process are shown along the axis of time. As shown here, liquids are supplied to flow cell 20 in the order of buffer, specimen, buffer, dissociating solution and buffer.

Figure 12:
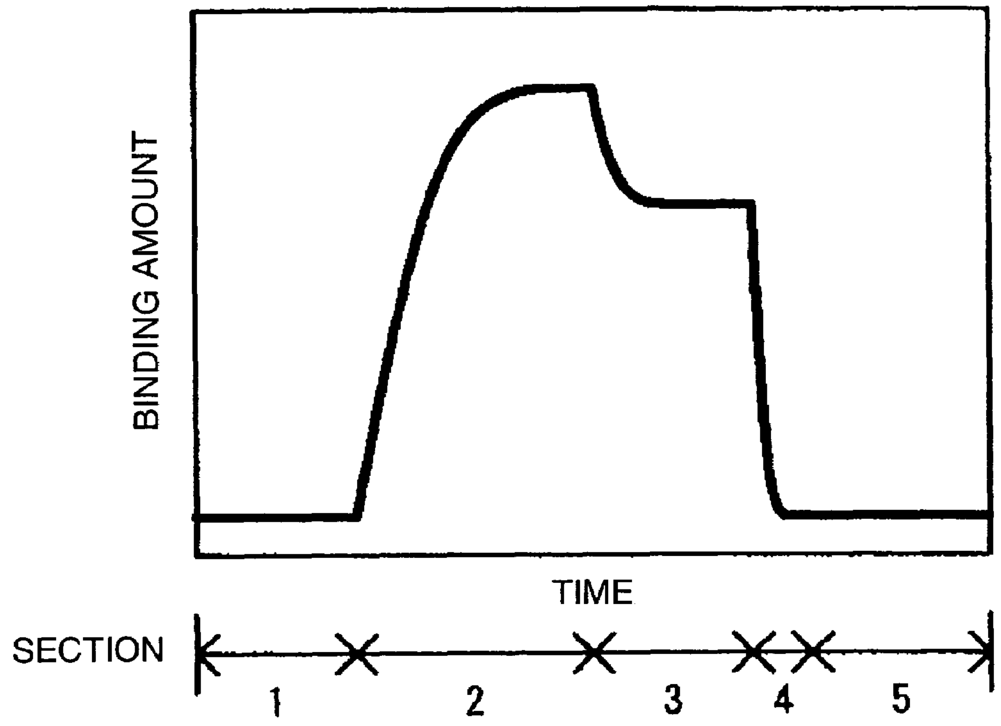
FIG. 12 is an image drawing of an analytical result by a biomolecule interaction analyzer in an example of the present invention.

FIG. 12 is an example of the results of analysis by the biomolecule interaction analyzer of the present invention when the determination process illustrated by the flow chart of FIG. 10 was carried out. "Binding amount" is a value indicating the amount of the molecules bound to the probe, which can be determined from the change of wavelength at the peak on the coherent light spectrum.

Section 1 represents the period of initial flow of the buffer, and Section 2 represents the period of flow of the specimen. Since the objective biomolecules are steadily bound to the probe in the detection region of chip 10 with the elapse of time, the binding amount keeps on increasing. Section 3 is the period of second flow of the buffer. The binding amount lowers since the objective biomolecules bound to the probe are dissociated. Section 4 represents the period of flow of the dissociating solution. The objective biomolecules bound to the probe are entirely dissociated by the dissociating solution. With the dissociating solution having flowed for a predetermined period of time, chip 20 returns to the original condition. Section 5 is the occasion of 3rd flow of the buffer. By this flow of the buffer, the condition in chip 20 is returned to Section 1. It is possible to repeat the determination process after Section 5 by changing the experimental conditions such as specimen concentration.

Figure 13:
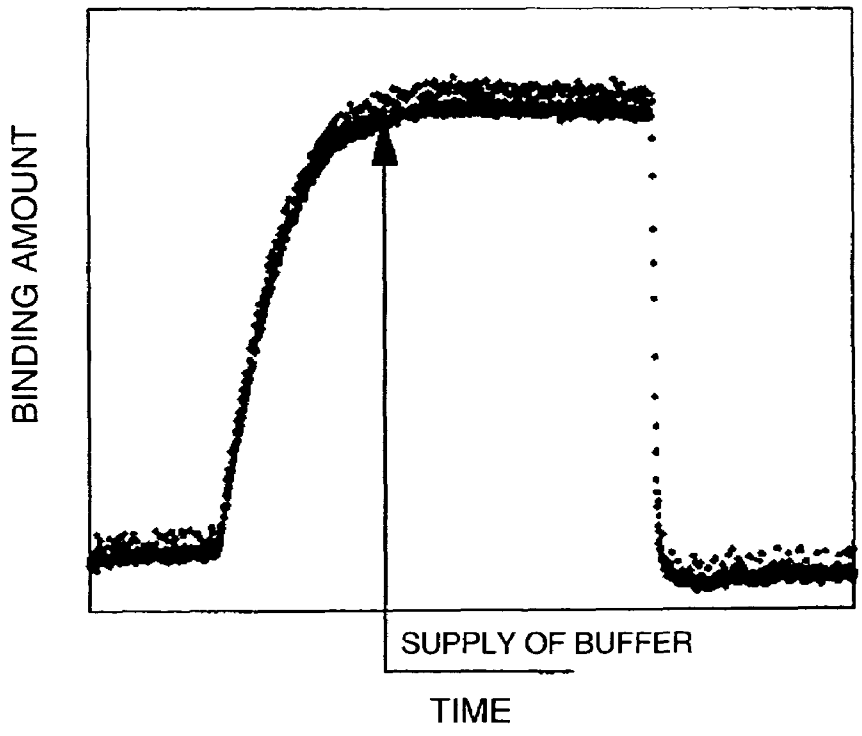
FIG. 13 is an analytical result by a biomolecule interaction analyzer in an example of the present invention.
Figure 14:
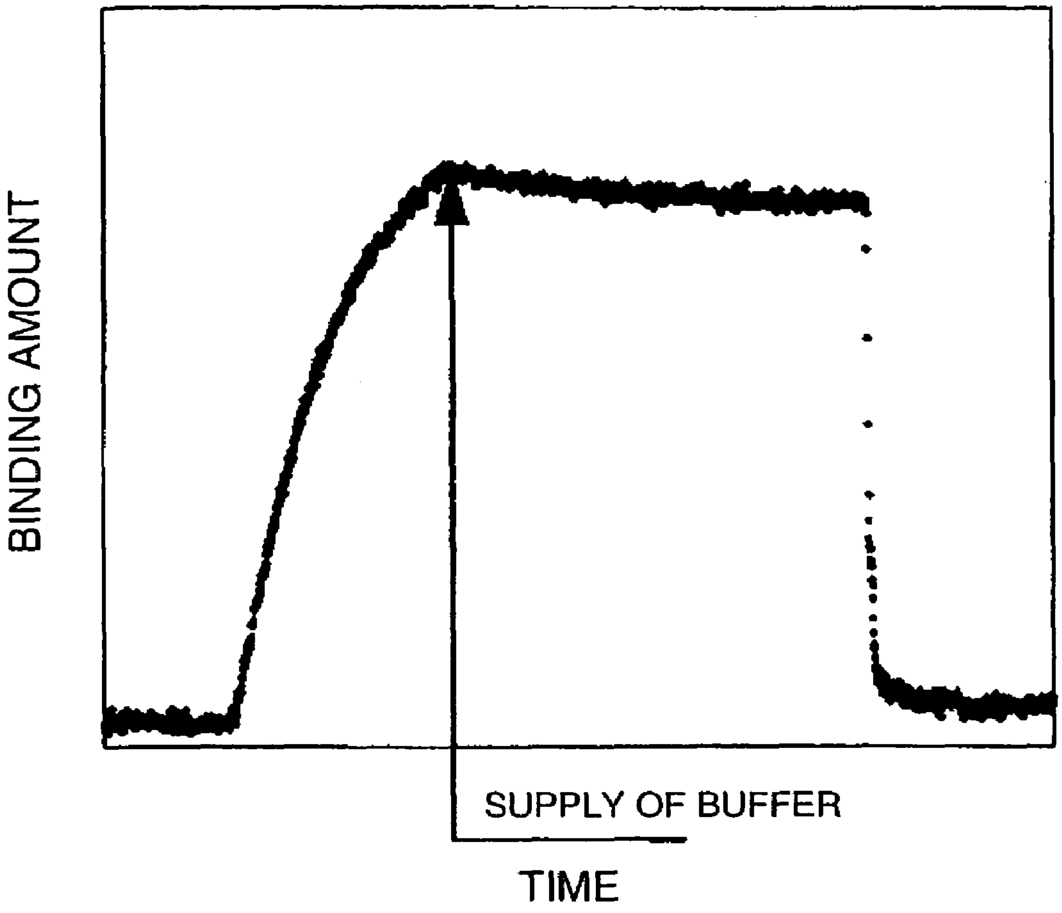
FIG. 14 is an analytical result by a biomolecule interaction analyzer in an example of the present invention.

FIG. 13 depicts an example of analytical result obtained when no air gap was applied between the reagent and the specimen used, and FIG. 14 shows an example of analytical result obtained when an air gap was applied between the reagent and the specimen used. In FIGS. 13 and 14, the liquid flowing in the chip is switched from specimen to buffer at the time point indicated by the arrow representing the addition of buffer. In FIG. 13, since no air gap is used, there is produced a mixed state of two liquids (specimen and buffer), and a liquid in the state of transition from specimen to buffer flows in the channel on the chip. Therefore, the overall analytical results include the result when the liquid was in the state of transition. Since the concentration of the objective biomolecules in the specimen is variable when the liquid is in the state of transition, it becomes difficult to determine the rate constant or binding constant from the analytical results. It is also difficult to judge, from the analytical results, which section on the time axis of analytical results is the section of the state of transition, and this adds to the difficulty in determining the correct rate constant or binding constant of the objective biomolecules. In FIG. 14, on the other hand, as the air gap prevents mixing of specimen and buffer, change of concentration of the objective biomolecules in the specimen can be avoided, and the time of switching of the two liquids can be known definitely. It is therefore possible to determine the correct equilibrium constant or rate constant of the objective biomolecules.

Figure 15:
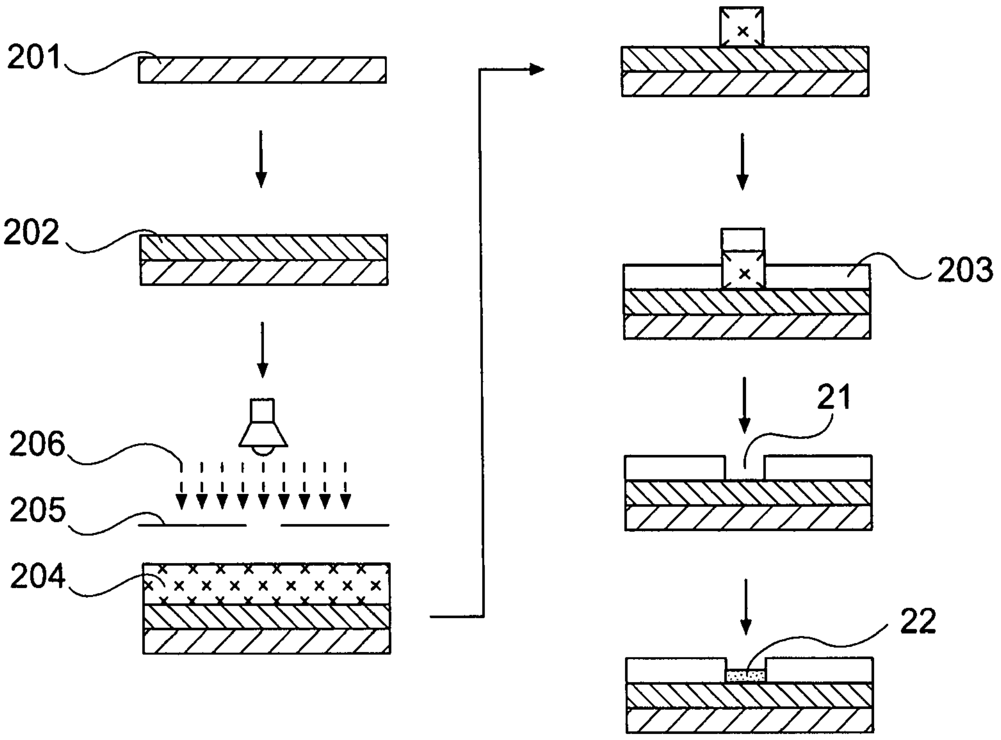
FIG. 15 is an illustration of the chip producing procedure in an example of the present invention.

FIG. 15 is a flow chart of the process of producing chip 20.

An approximately 10 to 100 nm thick optical thin film of silicon nitride 202 was deposited on silicon substrate 201, and an approximately 0.1 mm thick dry film resist 204 was laminated thereon, after which a reverse pattern of groove 21 constituting a channel of chip 20 was formed by photolithography. Numeral 205 designates a mask of groove 21, and numeral 206 refers to ultraviolet rays. Fine particles of a fluorine resin were spray coated to a thickness of 10 nm to 0.1 mm to form water-repellant particle layer 203, and then dry film resist 204 was separated to form a channel in the particle layer.

Although a reverse pattern of channel was formed by using a resist film in this example, it is possible to directly form a channel pattern using the photolithographical techniques by depositing a photosensitive water-repellant film on a silicon substrate having an optical film formed thereon.

Also, in the instant example, a chip using a film with a high refractive index was formed, but it is also possible to form chips incorporating biosensors using other detection means, for instance, absorbance detection, fluorescence detection, surface plasmon resonance or Dual Polarization Interferometer. In the chips for fluorescence detection, for example, probe is bound after a channel has been formed in the transparent substrate of glass or acrylic resin.

Figure 16:
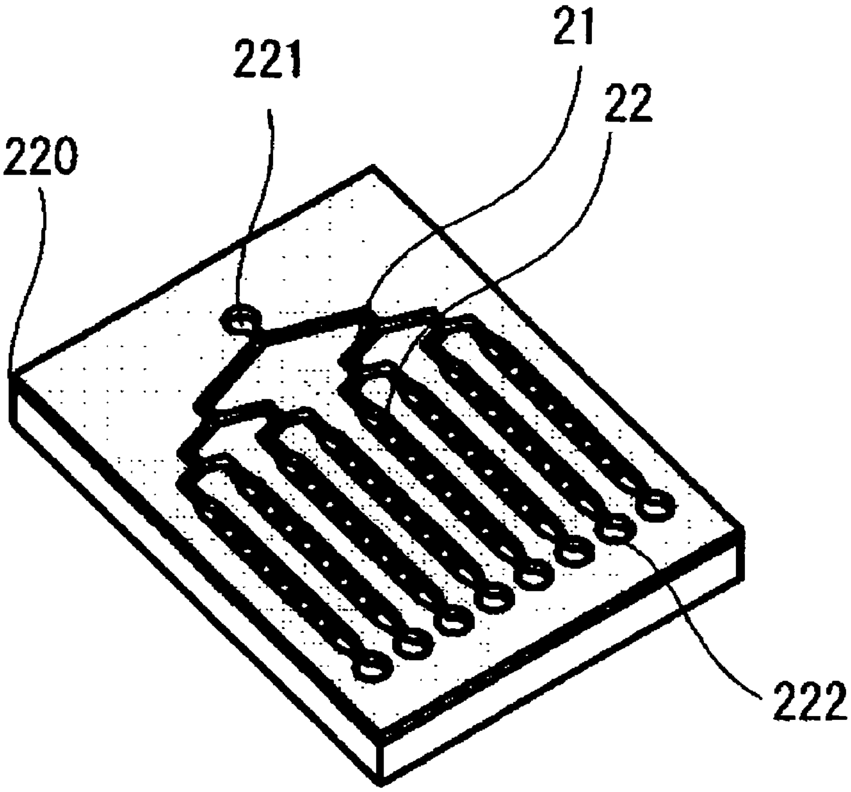
FIG. 16 is a bird's-eye view of a chip in an example of the present invention.

FIG. 16 shows a chip with multiple channels and detection regions. Groove 21 is ramified into eight channels, and seven detection regions 22 are formed for each groove to provide a total of fifty six detection regions. The reagent and specimen sent from liquid supply section 30 (FIG. 2) enter array chip 220 from its inlet end 221, then are equally divided along the groove 21, pass on the respective detection regions 22, and flow out from outlet ends 222 of the respective channels into discharge container 50. Since array chip 220 is capable of coupling different probes for the respective detection regions, it is possible to examine the interaction between one specimen and a plurality of biomolecules.

Figure 17:
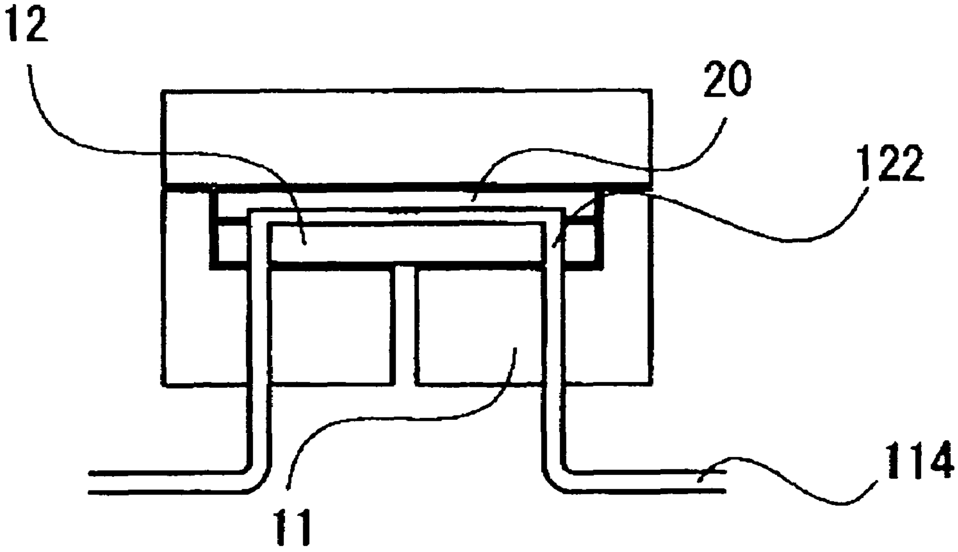
FIG. 17 is a cross section of a flow cell in an example of the present invention.

FIG. 17 is a cross section of a modification of flow cell 10 with its structure turned upside down. Since chip 20 is set at a higher position than outlet hole 122, outlet port 112 and discharge channel 114, pressure of the liquid flowing in groove 21 is lowered. This has the effect of making it less liable for the liquid to leak from between groove 21 and optical window 12.

Example 2

Shown here is an example of chip making use of surface plasmon resonance.

Figure 18:
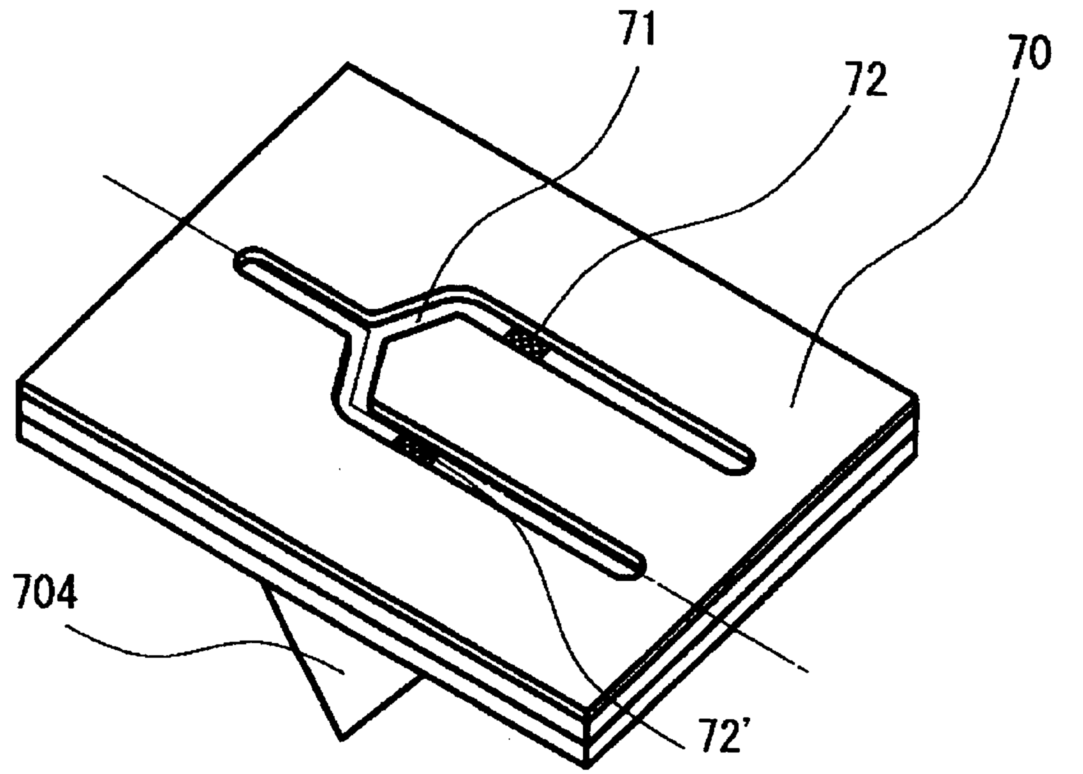
FIG. 18 is a bird's-eye view of a chip in an example of the present invention.

FIG. 18 is a bird's-eye view of chip 70. Chip 70 has a prism 704 on one side and a groove 71 on the other side, and detection regions 72, 72' for detecting the objective biomolecules are provided on the surface of groove 71. In region 72, a probe for binding the objective biomolecules is provided, but no such probe is provided in region 72' as in Example 1. The latter region 72' is used as reference.

Figure 19:
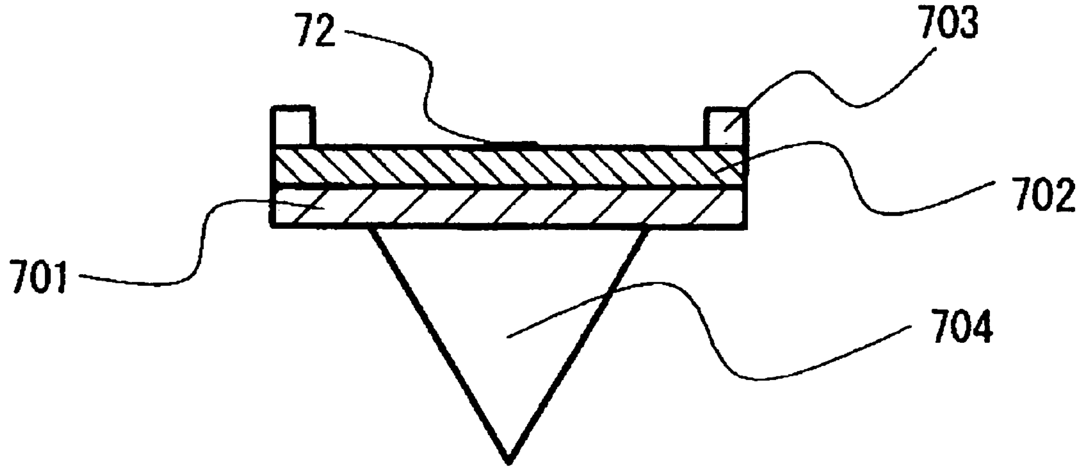
FIG. 19 is a cross section of a chip in an example of the present invention.

FIG. 19 is a cross section of chip 70. This chip 70 comprises a light-transmittable substrate 701, a metallic thin film layer 702, a water-repellant particle layer 703, a prism 704 and a detection region 72. There may be used, for instance, a quartz glass substrate as light-transmittable substrate 701, a thin film of gold as metallic thin film layer 702, and fine particles of a fluorine resin for water-repellant particle layer 703.

Figure 20:
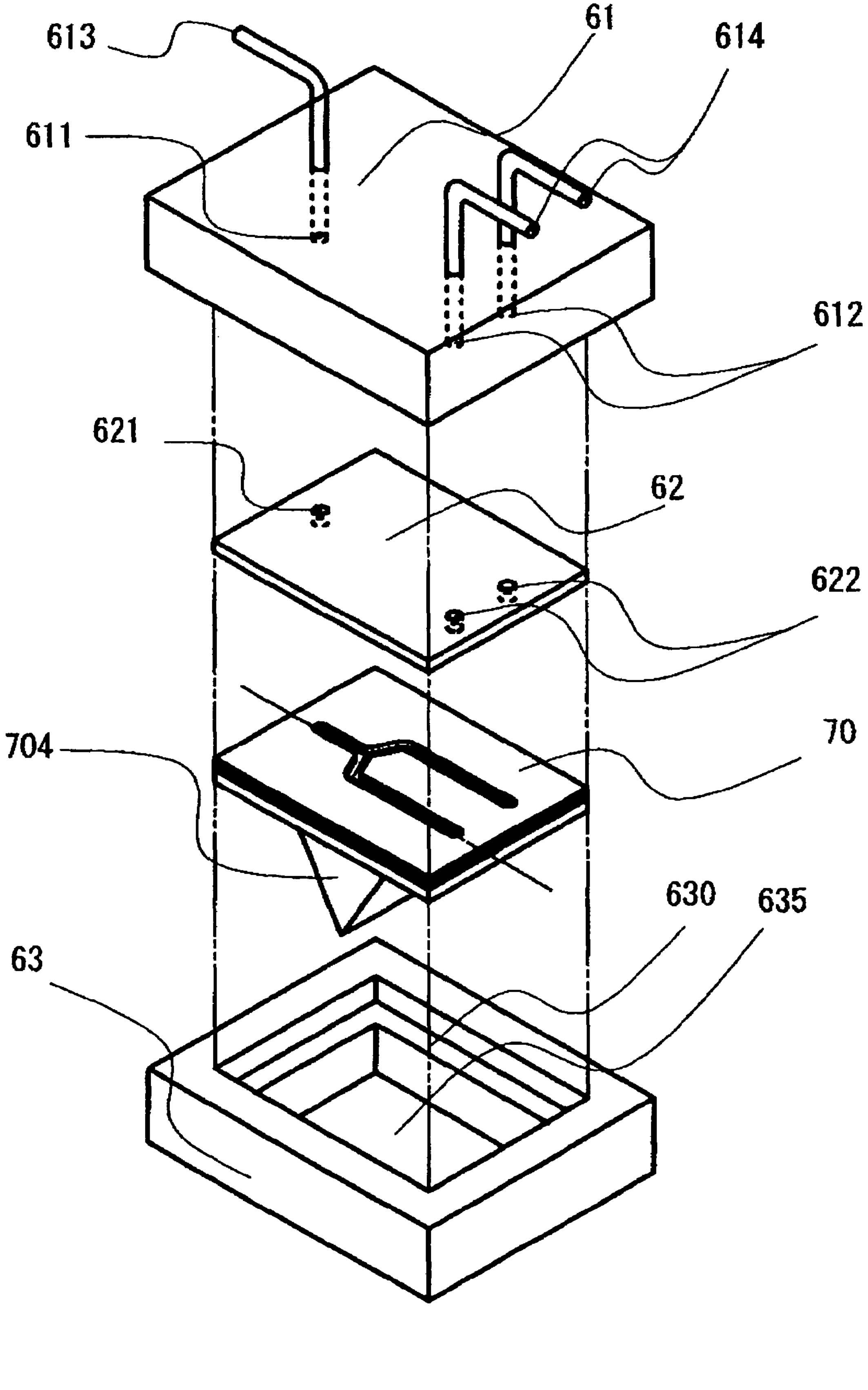
FIG. 20 is an exploded view of a flow cell in an example of the present invention.

FIG. 20 is an exploded view of a combination of chip 70 and a flow cell. The flow cell consists of a top cover 61, an inner cover 62 and a base block 63. In use, these members are placed one over another in the order of top cover 61, inner cover 62, chip 70 and base block 63.

Top cover 61 is provided with an inlet opening 611 for supplying reagent and specimen to the flow cell through inner cover 62, an outlet opening 612 for discharging reagent and specimen from flow cell 60 through inner cover 62, a supply channel 613 which connects the reagent and specimen supply section (not shown) and the flow cell, and a discharge channel 614 which connects the flow cell and a used liquid container (not shown) in which the used reagent and specimen are stored.

Inner cover 62 has an inlet opening 621 (through hole) for supplying reagent and specimen to the flow cell, and outlet openings 622 (through holes) for discharging reagent and specimen from the flow cell. Its side contacting chip 70 is water repellant.

Base block 63 has a concave portion 630 for housing inner cover 62 and chip 70, and an opening 635 for exposing prism 704 to the outside of the flow cell.

Figure 21:
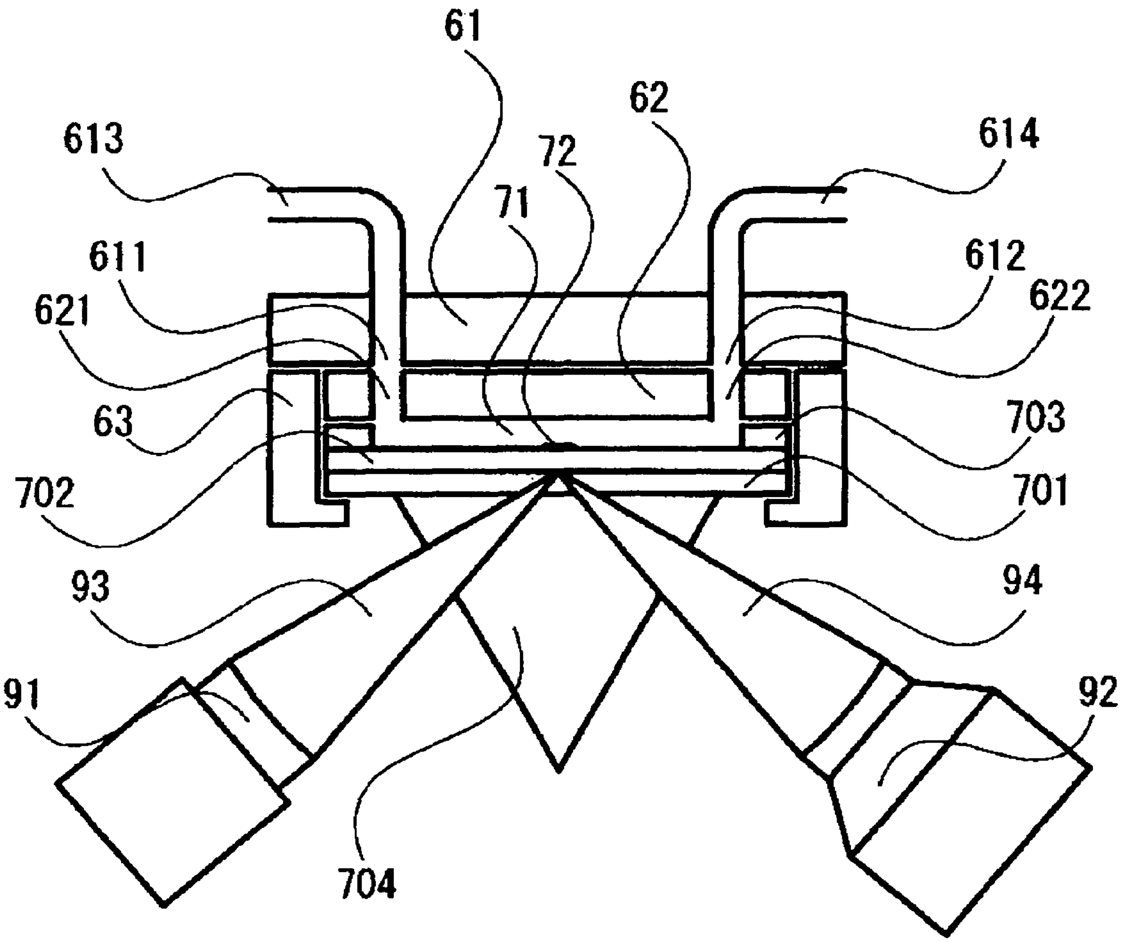
FIG. 21 is a structural illustration of a detection section and a flow cell in an example of the present invention.

FIG. 21 is an illustration of a combination of a flow cell and a detection section where the objective biomolecules specifically bound to the probe molecules are detected by making use of surface plasmon resonance. The flow cell is shown in section. As in Example 1, chip 70 is set so that its side having groove 71 will contact inner cover 62. Inner cover 62 and chip 70 are fitted in concave portion 630 of block 63, and block 63 and top cover 61 are fixed in position, whereby inner cover 62 and chip 70 are pressed against top cover 61 and fixed in this state. Inlet port 611, inlet hole 621, an end of groove 71, outlet port 612, outlet hole 622 and the other end of groove 71 are aligned with each other. Combination of groove 71 and inner cover 62 forms a channel on chip 70. The reagent and specimen sent from the liquid supply section to the flow cell pass through feed channel 613, inlet port 611, inlet hole 621, groove 71, outlet hole 622, outlet port 612, and discharge channel 614 and flow into the waste liquid container.

The detection section comprises a monochromatic light source 91 and a detector 92. Incident light 93 of P-polarization from monochromatic light source 91 enters chip 70 under the total reflection condition of metallic thin film layer 702, and the detector detects reflected light 94 from metallic thin film layer 702. The intensity of reflected light of a certain angle lowers due to surface plasmon resonance.

As the apparent refractive index of metallic thin film layer 702 changes with binding of the objective biomolecules in the specimen to the probe in detection region 72, the angle at which the intensity of reflected light lowers is varied. By analyzing this change by a system unit (not shown), it is possible to determine the condition of binding of the objective biomolecules.

It has been described in Examples 1 and 2 that by providing a hydrophobic and air-permeable particulate layer on the chip having a sensor, deaeration is practiced to get rid of the influence of air bubbles in detection while quickly removing the air gap at the time of liquid supply. This deaeration mechanism can be applied to the microchips using a mixing channel of two liquid, electrophoresis or electroosmotic flow as liquid supply means. In this case, it is possible to effectuate deaeration of the mixed air bubbles in the same way as in Examples 1 and 2. Thus, the deaeration mechanism of the present invention is effective as a deaeration method for the chips with micro channels.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A chip comprising:

a first substrate;

an intermediate member having hydrophobicity and air permeability and forming a specified channel on said first substrate; and a second substrate which is opposite to the intermediate member, wherein the intermediate member is composed of water-repellant particles having a size in the range of from about 10 nm to about 1 mm, wherein said channel is defined by a bottom having a hydrophilic surface and a wall composed of the water-repellant particles.

2. A chip according to claim 1 wherein a thin film is provided at least at a part of a surface of said first substrate, with at least a part of a surface of said thin film being hydrophilic.

3. A chip according to claim 1 wherein said first substrate is made of a material selected from the group consisting of silicon, glass, quartz, PMMA, titanium oxide, silicon oxide, zirconium oxide, hafnium oxide and tantalum oxide.

4. A chip according to claim 2 wherein said thin film is made of a material selected from the group consisting of silicon nitride, silicon, glass, quartz, PMMA, titanium oxide, silicon oxide, zirconium oxide, hafnium oxide and tantalum oxide.

5. A chip according to claim 2 wherein said thin film is made of a material having a refractive index of 1.8 to 3.0.

6. A chip according to claim 1 wherein said intermediate member is composed of fine particles of a fluorine resin or silicone resin.

7. A chip according to claim 1 wherein the second substrate has a liquid inlet and a liquid outlet.

8. A chip according to claim 7 wherein the length of said channel is greater than the length of said liquid inlet and the length of said liquid outlet, at least in a direction perpendicular to a flowing direction of a solution in said channel.

9. A chip according to claim 1 wherein said second substrate is hydrophobic at least at a part of its side facing said first substrate.

* * * * *